Patented Jan. 11, 1938

2,104,733

UNITED STATES PATENT OFFICE 2,104,733

ELECTROLYTE AND METHOD OF MAKING SAME

Joseph B. Brennan and Emma Leona Marsh, Fort Wayne, Ind.; said Marsh assignor to said Brennan No Drawing. Application February 2, 1935, Serial No. 4,634

9 Claims. (Cl. 175—315)

This invention relates to electrolytes and methods of making same, and more particularly to pasty or semi-liquid electrolytes for use with the so-called dry electrolytic condensers embodying electrodes of aluminum or other film-forming metals provided with current blocking films.

An object of our invention is to provide an improved film-forming and film-maintaining electrolyte. Another object is to provide an electrolyte which will produce condensers having low power factor losses and high capacities per unit of area. Another object is to produce an electrolyte which will give an increased rate of film formation and produce films of great durability. Another object is to produce a pasty or fluid electrolyte which will retain its characteristics over a long period of time and which will have little or no tendency to dry out or evaporate. A more specific object is to produce an electrolyte particularly suited for use in condensers having electrodes treated to increase the effective surface area thereof, for example by etching as disclosed in the prior application of Joseph B. Brennan Serial No. 673,772, filed May 31, 1933, or by metal spraying as disclosed in the prior application of Joseph B. Brennan Serial No. 662,107, filed March 22, 1933. Another object is to provide an electrolyte having the advantageous characteristics outlined above, and which can be economically manufactured and readily applied to condensers of various types.

Further objects and advantages of our invention will appear in the following description of preferred forms thereof. The essential characteristics are summarized in the claims.

We have found that we can economically attain the objects noted above and produce an electrolyte having very superior qualities by forming a paste comprising one or more of the ordinary film-forming acids, such as boric acid or lactic acid, an ammonium salt thereof, and a polyhydric alcohol such as ethylene glycol or glycerine and adding to the paste a water soluble amine having suitable boiling and freezing points. While the theories underlying the operation of our electrolytes are not definitely known to us, it seems that perhaps amines are particularly suitable as solvents because they are slightly ionized and are thus conductors of electricity, resulting in the production of electrolytes of low resistance. Furthermore, amines in such combinations are quite stable and have no corrosive effect on materials ordinarily used in the construction of condensers.

Because of their higher boiling points, tertiary aromatic amines are particularly suitable, and we have found that commercial pyridine, an inexpensive, readily available tertiary amine boiling at 115° C. and freezing at −42° C., is especially suitable. Pyridine is alkaline in reaction, and as a base it possibly may form salts with the film-forming acids present in the electrolyte. Most of the salts of pyridine are readily soluble, and at the present time we do not know whether or not such salts are present in our electrolyte. We have found that benzylamine ($PhCH_2NH_2$), tetramethylammonium hydroxide ($Me_4NOH$), and ethanolamines ($N(CH_2CH_2OH)_3$), are also suitable as solvents, but we prefer to employ pyridine, because of its low cost and generally desirable characteristics.

We prefer to prepare our electrolyte in substantially the following proportions and according to the following procedure: To 142 gms. of boric acid we add approximately 33 cc. of ammonium hydroxide, and to this we add approximately 95 cc. of a polyhydric alcohol, such as ethylene glycol or glycerine and 5 cc. of 85% lactic acid. The above mixture is heated until a solution is obtained and then 85 gms. of boric acid are added to the solution and the resulting mixture is heated to approximately 125° C., after which it is cooled to approximately 115° C., and at this temperature 40 cc. of commercial pyridine are added. This mixture is then agitated for a short time and is ready for use.

By the foregoing procedure, a complete solution is obtained which may be applied to condenser electrodes and to the separators used in combination therewith, readily and easily. This electrolyte retains its fluidity so that it may be applied in the condenser assembly at temperatures as low as 35° C.

We have found that variations of the above formula are entirely acceptable and give excellent results, such as the following, for example:

*Example 1*

| | | |
|---|---|---|
| Boric acid | gms | 142 |
| Ammonium hydroxide | cc | 33 |
| Glycol | cc | 106 |
| Acetamide | gms | 25 |

We add 85 gms. of boric acid to the paste after the paste is in solution. The paste is then heated to 125° C., cooled to 115° C., and 40 cc. of commercial pyridine are added.

*Example 2*

| | | |
|---|---|---|
| Boric acid | gms | 142 |
| Ammonium hydroxide | cc | 33 |
| Glycol | cc | 95 |

To this paste are added 85 gms. of boric acid after the paste is in solution. The paste is then heated to 125° C., cooled to 115° C., and 40 cc. of commercial pyridine are added.

*Example 3*

| | | |
|---|---|---|
| Boric acid | gms | 142 |
| Ammonium hydroxide | cc | 33 |
| Glycol | cc | 95 |
| Pyridine | cc | 15 |

To this paste are added 85 gms. of boric acid after the paste is in solution. The paste is then heated to 125° C., cooled to 115° C., and 40 cc. of commercial pyridine are added.

As stated above, another method of procedure which we have found satisfactory has been to add a portion of pyridine to the original mixture before heating and adding 40 cc. after cooling.

Each of the above formulae will produce excellent electrolytes which will retain their fluidity at temperatures of less than 50° C., so that the electrolytes can be easily applied to condensers. If desired the crystallization temperature can be further lowered by employing greater amounts of pyridine.

Electrolytes made according to the above formulae may be utilized in ordinary paste type condensers of the type comprising interwound or stacked sheets of aluminum foil with suitable permeable spacers between the surfaces of the adjacent sheets, the surfaces being sprayed or impregnated with the electrolyte. The electrolytes are particularly suitable for condensers in which the effective area of the plates is increased by the methods disclosed in the Brennan applications referred to above. Condensers embodying our electrolyte will successfully withstand voltages of over 550 volts and are suitable for either direct current or alternating current installations. For alternating current installations, both electrodes of the condenser are preferably made of aluminum sheets or plates provided with dielectric films, while for direct current installations one or more anodes are provided with dielectric films and the cathode or cathodes may be of non-filming metal.

Condensers embodying our electrolytes have low resistance and low power factor losses and high capacities per unit of area. The dielectric film is formed rapidly and promptly reformed after a breakdown due to excessive voltage. Because of the film-forming properties of our electrolytes the leakage in condensers is low and the dielectric film is properly maintained. Our electrolytes are stable under a wide range of temperatures and have no apparent corrosive action on the anodes or cathodes of condensers. Because our electrolytes retain their fluidity at fairly low temperatures, they may be readily manipulated and applied to condensers. The cost of our electrolytes is low because of the low cost of pyridine. The electrolytes do not evaporate readily, and accordingly it is not necessary to seal perfectly the containers of condensers embodying our electrolytes.

It will be obvious to those skilled in the art that various changes and modifications may be made in our electrolytes and in the methods of preparing them. For example, greater or less proportions of pyridine may be employed if desired, and in order to produce a more fluid electrolyte water may be added thereto. Various equivalent substances may be employed in place of the substances disclosed herein as will be evident to those skilled in the art. It is therefore to be understood that our invention is not limited by the foregoing description or in any manner other than by the appended claims when given the range of equivalents to which our patent may be entitled.

We claim:

1. An electrolyte for electrolytic condensers consisting principally of a solution of a salt of a weakly ionized film-forming acid in a polyhydric alcohol and pyridine.

2. An electrolyte for electrolytic condensers consisting principally of a film-forming acid and an ammonium salt thereof in a solution of a polyhydric alcohol and pyridine.

3. A film-forming electrolyte for electrolytic condensers consisting principally of a solution of an ammonium salt of a film-forming acid, and an amide in a polyhydric alcohol and pyridine.

4. An electrolyte for electrolytic condensers consisting principally of a viscous solution of boric acid, ammonium hydroxide, a polyhydric alcohol and pyridine, the said solution retaining its fluidity at a temperature of 50° C.

5. A method of making an electrolyte for electrolytic condensers comprising essentially the steps of mixing boric acid and ammonium hydroxide, adding a polyhydric alcohol to the mixture, heating the mixture until a solution is obtained and adding pyridine to the solution.

6. A method of making an electrolyte for electrolytic condensers including essentially the steps of making a paste comprising a film-forming acid and a polyhydric alcohol, and adding pyridine thereto.

7. A method of making an electrolyte for electrolytic condensers including essentially the steps of mixing boric acid, lactic acid, ammonium hydroxide and a polyhydric alcohol in substantially the proportions of 142 grams of boric acid, 5 cc. of 85% lactic acid, 28 cc. of 28% ammonium hydroxide and 95 cc. of polyhydric alcohol, heating the mixture until a solution is obtained, adding boric acid in the proportion of about 85 grams to the solution, heating the resulting mixture to about 125° C., cooling the mixture to about 115° C., and at about this temperature adding pyridine to the mixture in the proportion of about 40 cc.

8. An electrolytic condenser comprising a film forming electrode and an electrolyte consisting principally of a solution of a film forming acid in pyridine.

9. An electrolytic condenser comprising a film forming electrode and an electrolyte including, as principal ingredients, a film forming acid, a polyhydric alcohol and pyridine.

JOSEPH B. BRENNAN.
E. LEONA MARSH.